United States Patent [19]

Bobrich et al.

[11] Patent Number: 5,543,226
[45] Date of Patent: *Aug. 6, 1996

[54] MAGNETIC RECORDING MEDIA

[75] Inventors: Michael Bobrich, Boehl-Iggelheim; August Lehner, Roedersheim-Gronau; Hermann Roller, Ludwigshafen; Rudolf Suettinger, Heidelberg; Ria Kress, Ludwigshafen; Norbert Schneider, Altrip; Werner Lenz, Bad Durkheim; Peter Engelhardt, Hessisch Oldendorf; Peter Rudolf, Maxdorf; Gregor Brodt, Heppenheim; Werner Balz, Limburgerhof; Albert Kohl, Laumersheim, all of Germany

[73] Assignee: BASF Magnetics GmbH, Mannheim, Germany

[*] Notice: The term of this patent shall not extend beyond the expiration date of Pat. No. 5,330,784.

[21] Appl. No.: 992,742

[22] Filed: Dec. 18, 1992

[30] Foreign Application Priority Data

Dec. 18, 1991 [DE] Germany .................. 41 41 838.7
Dec. 18, 1991 [DE] Germany .................. 41 41 839.5

[51] Int. Cl.⁶ .............................. G11B 5/66; B32B 27/00
[52] U.S. Cl. ........................... 428/423.1; 428/425.9; 428/694 B; 428/694 BU; 428/694 BY; 428/694 BL; 428/900; 252/62.54
[58] Field of Search .................. 428/423.1, 425.9, 428/694, 900, 694 B, 694 BU, 694 BY, 694 BL; 252/62.54

[56] References Cited

U.S. PATENT DOCUMENTS

| 2,871,218 | 1/1959 | Schollengerger et al. | 525/440 |
| 2,899,411 | 8/1959 | Schollengerger et al. | 528/76 |
| 4,152,485 | 5/1979 | Mizumura et al. | 428/423.7 |
| 4,477,531 | 10/1984 | Kohler et al. | 428/425.9 |
| 4,559,118 | 12/1985 | Heil | 428/423.1 |
| 4,666,781 | 5/1987 | Lehner | 428/425.9 |
| 4,786,657 | 11/1988 | Hammar et al. | 522/90 |
| 5,130,202 | 7/1992 | Keppeler et al. | 428/425.9 |
| 5,330,784 | 7/1994 | Bobrich | 427/131 |

FOREIGN PATENT DOCUMENTS

| 099533 | 2/1984 | European Pat. Off. . |
| 0193084 | 9/1986 | European Pat. Off. . |
| 2753694 | 6/1979 | Germany . |
| 3814536 | 11/1988 | Germany . |
| 57-092422 | 6/1982 | Japan . |
| 57-092421 | 6/1982 | Japan . |

OTHER PUBLICATIONS

H. Fikentscher, "Cellulose Chemie" 13 (1932) pp. 58–64.

Primary Examiner—Leszek Kiliman
Attorney, Agent, or Firm—Keil & Weinkauf

[57] ABSTRACT

Magnetic recording media consist of a nonmagnetic substrate and at least one magnetizable layer bonded thereon and based on a magnetic material dispersed in at least one polyurethane and one polyurethaneurea (meth)acrylate, the polyurethaneurea (meth)acrylate being obtained by reacting a hydroxyl-containing poly(meth)acrylate with a mixture of di- and polyisocyanates and converting the remaining NCO groups with ammonia or primary or secondary amines into urea groups.

4 Claims, No Drawings

MAGNETIC RECORDING MEDIA

TECHNICAL FIELD

The present invention relates to magnetic recording media consisting of a nonmagnetic substrate and at least one magnetizable layer bonded thereon and based on a magnetic material dispersed in a binder mixture of a polyurethaneurea (meth)acrylate and a polyurethane.

BACKGROUND OF THE INVENTION

Increasingly high requirements are being set for magnetic recording media with regard to recording, playback and aging resistance. The binder is becoming increasingly important for meeting these requirements.

For example, to improve the magnetic properties, in particular the residual induction, a high packing density of the magnetic material in the layer is desirable, which results in a reduction in the binder content of the layer. Attempts have also been made to achieve an improved signal/noise ratio and a very narrow field strength distribution by using increasingly finely divided magnetic materials having a pronounced and extremely uniform acicular shape. These materials are also very often surface-modified to reduce aging phenomena. Because of such measures, both the division of the pigments in the dispersing process and the achievement of good dispersion stability are made considerably more difficult. Moreover, the magnetic layers must be very flexible and have high resilience and a high tensile strength. In addition, to avoid drops in output level, a reduction in the coefficients of friction and an increase in the abrasion resistance and resistance to wear are increasingly required. Furthermore, this mechanical stability of the magnetic layer must be ensured even at high temperatures and high atmospheric humidity.

It is known that magnetic layers which are subjected to severe mechanical stresses contain polyurethane elastomers which prove to be advantageous as binders. Polyesterurethanes as described in DE-B 1 106 959, DE-B 2 753 694, EP-A 0 069 955 or U.S. Pat. No. 2,899,411 have proven particularly useful.

However, these binders can no longer adequately fulfil all of the requirements and measures described above. In many cases, particularly with the very finely divided materials, pigment wetting and pigment dispersing is adversely affected so that any sintered material produced in the milling process is insufficiently divided up, while agglomeration of the pigment particles is not sufficiently prevented, leading to poor magnetic properties and hence to poor tape properties in respect of electroacoustics and video data. For this reason, low molecular weight dispersants are added in relatively small amounts to facilitate the dispersing process. However, these dispersants have disadvantages. For example, low molecular weight dispersants may readily be exuded under disadvantageous climatic conditions, such as high temperature and/or high atmospheric humidity. This gives rise to deposits on all parts in contact with the tape, especially on the head, in recording or playback apparatuses, causing drops in output levels. Furthermore, the friction (adhesion) increases sharply, with the result that the tape may come to a stop, ie. block. When dispersing resins are used, on the other hand, there may be compatibility problems in the dispersion. Since these dispersants contain polar groups, the hydrophilicity of the layer increases greatly, and hence, especially in a humid climate, also effects such as swelling of the layer, exudation of the dispersants and lubricants and changes in the mechanical properties due to changes in the plasticizer effects.

To improve the dispersing properties of the polyurethane binders, it was proposed at an early stage to incorporate polar groups in the binder. These polar groups can in principle be introduced via any component which is used in the preparation of the polyurethane. Polyesters having polar groups are most frequently used (inter alia DE-A 28 33 845). Incorporation of diols which additionally carry polar groups is described in, for example, JP-A 57 092 421, German Laid-Open Application DOS 3,814,536 or EP-A 193 084. Subsequent incorporation of the polar groups by an $S_N$ reaction at the terminal OH group of the polyurethanes is disclosed in JP-A 57 092 422. Although these dispersing resins disperse the pigments very well on the one hand, they lead on the other hand, especially with increasing fineness of the magnetic pigments used, to dispersions having extremely disadvantageous rheological properties, such as a high flow limit and high viscosity, so that further processing of these dispersions to magnetic layers is very difficult. Furthermore, the content of ionic dispersant groups in the dispersing resin is limited to a maximum concentration since otherwise adverse effects, such as flocculation with bridging, occur. An increase in the pigment volume concentration on the one hand and a reduction in the particle size on the other hand are no longer compatible with the dispersing resin content then required.

A substantial improvement in the dispersing behavior could be achieved using low molecular weight, OH-containing polyurethanes, as described in European Patent 0,099,533. However, these measures too are not sufficient for dispersing the increasingly finely divided pigments and for meeting the higher and higher requirements which the magnetic recording media have to meet with respect to mechanical and magnetic properties.

SUMMARY OF THE INVENTION

It is an object of the present invention to provide magnetic recording media whose magnetic layer contains a binder based on a polyurethane, lubricant and finely divided magnetic material and, as a result of the addition of a further binder, an improved resistance to wear, in particular at high temperature and humidity, the higher residual induction, a narrower field strength distribution and a layer surface with few defects. Magnetic layers having few defects and good running properties require a binder system which, in addition to the high packing density of a magnetic material, the high residual induction in the narrow field strength distribution must also give a very stable magnetic dispersion.

We have found that this object is achieved by magnetic recording media consisting of a nonmagnetic substrate and at least one magnetizable layer which is bonded thereon and is based on a magnetic material dispersed in a binder mixture of polyurethaneurea (meth)acrylate and at least one polyurethane from the group consisting of polyurethane elastomers, high molecular weight OH-containing polyureaurethanes and low molecular weight, OH-containing polyureaurethane, if the polyurethaneurea (meth)acrylate is obtained by reacting a poly(meth)acrylate having up to 2 terminal OH groups per mol and a molecular weight of from 200 to 50,000 with a mixture of aliphatic polyisocyanates having an average functionality of from 3.0 to 6 NCO groups per mol and consisting of from 0.1 to 10% by weight of a diisocyanate, from 20 to 80% by weight of a triisocyanate and from 20 to 60% by weight of an isocyanate having a functionality of from 4 to 10, with the proviso that from 1.3 to 3.0, preferably from 1.5 to 2.5, NCO groups react per OH group and the remaining NCO groups are converted with ammonia into urea groups.

DETAILED DESCRIPTION OF THE INVENTION

In a preferred embodiment of the novel magnetic recording media, the polyurethaneurea (meth)acrylate present in the binder mixture is obtained by reacting a poly(meth)acrylate having up to 2 terminal OH groups per mol and a molecular weight of, in particular, from 400 to 4,000 with the stated mixture of aliphatic polyisocyanates having an average functionality of from 3.5 to 5.5 NCO groups per mol. A mixture which is composed of from 0.3 to 8% by weight of a diisocyanate, from 30 to 70% by weight of a triisocyanate and from 20 to 50% by weight of an isocyanate having a functionality of from 4 to 10 is particularly suitable for this purpose.

The poly(meth)acrylate used for the preparation of the polyurethaneurea (meth)acrylate is an esterification product of (meth)acrylic acid and an alcohol component having a $C_1$–$C_{25}$-alkyl radical and from 0 to 2.5% of hydroxyalkyl (meth)acrylate having a $C_1$–$C_{25}$-alkylene radical. Examples of suitable alkyl radicals are methyl, ethyl, propyl, butyl, isopropyl, tert-butyl, pentyl, nonyl and stearyl. Suitable hydroxyalkyl (meth)acrylates include ethanediol monoacrylate, propanediol monoacrylate and butanediol monoacrylate.

It is also advantageous in the polymerization to block the OH groups at the chain ends via OH-containing polymerization initiators, such as hydroperoxides, or OH-containing regulators, eg. tert-butanol, mercaptoethanol or ethanolamine.

In the preparation of the poly(meth)acrylate, other known vinyl monomers may also be incorporated, for example vinylbenzene, vinyl chloride, vinyl acetate, vinyl propionate, acrylamide or acrylonitrile.

Suitable isocyanates and their reaction products include toluylene diisocyanate and diphenylmethane diisocyanate. Aliphatic isocyanates and their reaction products in the form of relatively high molecular weight polyisocyanates, as formed by an addition reaction of di-, tri- and possibly polyols with aliphatic diisocyanates or by biuret or isocyanurate formation, are particularly suitable. Suitable aliphatic diisocyanates for this purpose are, for example, hexamethylene diisocyanate or isophorone diisocyanate.

The polyurethaneurea (meth)acrylates which are composed of the building blocks described have a broad molecular weight distribution to ensure good dispersing behavior and high stability of the dispersion. The molecular weight is from 200 to 50,000, preferably from 500 to 40,000 (measured by GPC), with a weight average molecular weight of from 1,000 to 10,000, in particular from 2,000 to 8,000, preferably from 4,000 to 7,000.

If polyurethaneurea (meth)acrylates which consist of 90% of di- and triisocyanates are used, unstable dispersions which lead to defective tapes are obtained. When predominantly trifunctional isocyanates are used, pigment dispersing is too slow or inadequate and the viscosity of the dispersions increases. This then leads to a very high solvent content in the dispersion.

The polyurethaneurea (meth)acrylate prepared in this manner has a hardness of from 20 to 130 s, according to DIN 53,157, a modulus of elasticity of from 500 to 2,500 N/mm$^2$ according to DIN 53,457, an elongation at break of greater than 70% (DIN 53,455) and a tensile strength of from 25 to 70 N/mm$^2$ (DIN 53,455). A pendulum hardness (DIN 53,157) of from 25 to 125 s, a modulus of elasticity of from 600 to 2,000 N/mm$^2$, an elongation at break of from 80 to 500% and a tensile strength of from 25 to 50 N/mm are particularly advantageous.

The low molecular weight OH-containing polyureaurethane (component 2) present in addition to the polyurethaneurea (meth)acrylate (component 1) in the binder mixture forming the magnetic layer of the novel magnetic recording medium is described in EP-B 99 533. It has an OH number of from 10 to 120 and is obtained by reacting a polydiol, a diol and a primary or secondary amino alcohol and, if required, a triol with a diisocyanate, whereas the polyurethane elasomers likewise used as component 2, especially the high molecular weight OH-containing polyureaurethane elastomers, are described in EP-A 281 873 and have an OH number of from 6 to 30.

The advantageous properties of the magnetic recording media produced according to the invention in comparison with those obtained using the conventional thermoplastic polyurethane elastomers are also evident when a polyisocyanate is added before application of the dispersion to the substrate. A large number of organic di-, tri- or polyisocyanates or isocyanate prepolymers having a molecular weight of up to 10,000, preferably from 500 to 3,000, can be used for crosslinking. Polyisocyanates or isocyanate prepolymers which carry more than two NCO groups per molecule are preferred. Polyisocyanates based on toluylene diisocyanate, hexamethylene diisocyanate or isophorone diisocyanate, which are formed by a polyaddition reaction with di- or triols or by biuret and isocyanurate formation, have proven particularly suitable. An adduct of toluylene diisocyanate with trimethylolpropane and diethylene glycol is particularly advantageous. Depending on the requirements set for the recording material, the amount of added polyisocyanate component may be up to 70%, preferably up to 50%, less or up to 100%, preferably up to 50%, more than a stoichiometric amount, based on the OH groups of the binders to be crosslinked.

The mixture forming the binder matrix of the magnetic layer of the novel magnetic recording media and consisting of low molecular weight OH-containing polyureaurethane and polyurethaneurea (meth)acrylate contains the last-mentioned component preferably in an amount of not more than 30, in particular not more than 15, % by weight. For special intended uses, it may be advantageous to add a further binder component in amounts of from 5 to 50, in particular from 10 to 30, parts by weight, based on the resulting total amount of materials.

These physically drying binders additionally present in the binder mixture are known. They include polyvinyl formal binders which were prepared by hydrolysis of a polymer of a vinyl ester and subsequent reaction of the vinyl alcohol polymer with formaldehyde. The polyvinyl formals advantageously contain at least 65, in particular at least 80, % by weight of vinyl formal groups. Suitable polyvinyl formals contain from 5 to 13% by weight of vinyl alcohol groups and from 80 to 88% by weight of vinyl formal groups and have a density of about 1.2 and a viscosity of from 50 to 120 mPa.s, measured at 20° C. using a solution of 5 g of polyvinyl formal in 100 ml of 1:1 phenol/toluene. In addition to the polyvinyl formal, vinyl chloride/diol mono- or di(meth)acrylate copolymers, which can be prepared, for example, in a conventional manner by solution copolymerization or suspension copolymerization of vinyl chloride and the diol monomethacrylate or monoacrylate, are also suitable. The diol monoacrylate, diacrylate, monomethacrylate or dimethacrylate used for this purpose is an esterification product of acrylic acid or methacrylic acid with the corresponding molar amount of an aliphatic diol of 2 to 4 carbon atoms, such as ethylene glycol, 1,4-butanediol or preferably propanediol, the propanediol preferably consisting of 1,3-propanediol and from 0 to 50% by weight of 1,2-propanediol. The copolymers advantageously have a vinyl chloride content of from 50 to 95% by weight and a diol acrylate or methacrylate content of from 5 to 50% by weight. Particularly suitable copolymers preferably contain from 70 to 90% by weight of vinyl chloride and from 10 to 30% by weight of diol monoacrylate or diol monomethacrylate. A 15% strength solution of particularly suitable copolymers, such as the vinyl chloride/propanediol monoacrylate copolymers, in a mixture of equal parts by volume of tetrahydrofuran and dioxane has a viscosity of about 30 mPa.s at 25° C. The K value (according to H. Fikentscher, Cellulosechemie 13 (1932), 58 et seq.) of the particularly suitable products is from 30 to 50, preferably about 40.

Phenoxy resins whose constitution can be described by the repeating formula

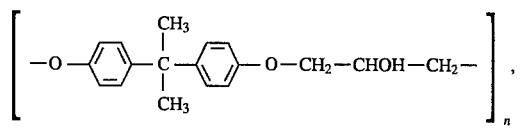

where n is roughly equal to 100, can also advantageously be used. These are polymers such as those known under the trade name Epikote® from Shell Chemical Co. or under the name epoxy resin PKHH® from Union Carbide Corporation.

Cellulose ester binders are also suitable for use in the binder mixture defined. These are esterification products of cellulose with nitric acid or with carboxylic acids of 1 to 4 carbon atoms, for example cellulose acetate, cellulose triacetate, cellulose acetopropionate and cellulose acetobutyrate.

The further processing of the binder mixture with magnetic materials and assistants to give the novel magnetic recording media is carried out in a conventional manner.

The conventional pigments which substantially influence the properties of the resulting magnetic layer, for example gamma-iron(III) oxide, finely divided magnetite, ferromagnetic undoped or doped chromium dioxide, cobalt-modified gamma-iron(III) oxide, barium ferrites or ferromagnetic metal particles, can be used as anisotropic magnetic materials. Acicular cobalt-modified or unmodified gamma-iron(III) oxide and ferromagnetic chromium dioxide and a metal pigment are preferred. The particle size is in general from 0.2 to 2 µm, preferably from 0.2 to 0.8 µm. Chromium dioxide and mixtures of chromium dioxide with up to 60% by weight of cobalt-doped iron oxide are particularly preferred.

In a manner known per se, the magnetic layers may furthermore contain additives, such as lubricants and, in minor amounts which are small compared with the prior art, dispersants as well as fillers, which are admixed during dispersing of the magnetic pigments or during the production of the magnetic layer.

The ratio of magnetic material to binder in the novel recording materials is from 1 to 10, in particular from 3 to 6, parts by weight of magnetic material to one part by weight of the binder mixture. It is a particular advantage that, owing to the excellent pigment-binding capacity of the special binder mixture, high concentrations of magnetic material are possible in the magnetic layers without the mechanical and elastic properties being adversely affected or the performance characteristics suffering markedly.

The conventional rigid or flexible substrates, in particular films of linear polyesters, such as polyethylene terephthalate, in particular in thicknesses of from 4 to 200 µm, in particular from 6 to 36 µm, can be used as nonmagnetic and nonmagnetizable substrates. Recently, the use of magnetic layers on paper substrates for electronic computing and accounting machines has also become important; the novel coating materials can also advantageously be used for this purpose.

The novel magnetic recording media are produced in a known manner. Advantageously, the magnetic pigment dispersion prepared in a dispersing apparatus, for example a tubular ball mill or a stirred ball mill, from the magnetic material and a solution of the binder with the addition of lubricants and possibly small amounts of dispersants is filtered after the polyisocyanate crosslinking agent has been mixed in and is applied to the nonmagnetic substrate using a conventional coating apparatus, for example by means of a knife coater. To achieve high electroacoustic and magnetic values in a short dispersing time, it is advantageous to carry out the dispersing with component 1 and to stir in component 2 after the dispersing procedure. This process is suitable since the stated component 2 is compatible with component 1. As a rule, magnetic orientation is carried out before the liquid coating mixture is dried on the substrate; the latter is advantageously effected in from 10 to 200 s at from 50° to 90° C. The magnetic layers can be calendered and compacted on conventional apparatuses by being passed between heated and polished rollers, if necessary with the application of pressure and at from 25° to 100° C., preferably from 60° to 90° C. In the case of crosslinking binders, it has proven very advantageous to carry out calendaring before crosslinking is complete, since the OH polymers in the uncrosslinked state are very thermoplastic without exhibiting tack. The thickness of the magnetic layer is in general from 0.5 to 20 µm, preferably from 1 to 10 µm. In the case of the production of magnetic tapes, the coated films are slit in the playing direction into the conventional widths generally specified in inches.

Compared with prior art magnetic recording media, the novel magnetic recording media possess improved fine roughness of the surface of the magnetic layer, greater resistance to wear, in particular at elevated temperatures and under humid conditions, and enhanced magnetic characteristics. As a consequence of these improved surfaces exhibiting fine roughness and the better magnetic values, there is a substantial increase in the HF output and the chroma output in the video sector as well as in the HiFi output. A further consequence of these improved properties is a greater signal-to-noise ratio due to reduced noise, especially the modulation noise, which decreases the necessity of using even more finely divided magnetic pigments. However, the larger pigment needles can be better oriented with the same orientation effort and thus give higher residual induction values and output levels than more finely divided magnetic pigments. Compared with the prior art, it is thus possible to reduce the technical effort for dispersing, coating and orientation of the magnetic layer without having to sacrifice the advantages of high recording density. As a result of the reduction in the dispersing effort and the dispersing time as well as the high solids content of the dispersion and the increased long-term stability of the dispersion, the novel magnetic recording media can be produced in a simple and economical manner.

In the Examples and Comparative Experiments which follow, parts and percentages are by weight, unless stated otherwise. Parts by volume bear the same relation to parts by weight as that of the liter to the kilogram.

The polyurea (meth)acrylate used in the Examples is composed of an OH-containing polyacrylate having an average molecular weight of 5,000 and a biuret polyisocyanate having an average functionality of 3.8, consisting of 0.5% of diisocyanate and 60% of triisocyanate, the remainder being polyisocyanate having an average functionality of 4.8, and the remaining NCO groups at the chain end being converted by ammonia into urea groups.

EXAMPLE 1

4,500 g of tetrahydrofuran, 912 g of a 50% strength solution of polyurethaneurea having an OH number of 55, 126 g of a 50% strength solution of a polyurethaneurea (meth)acrylate, 510 g of a 20% strength solution of a polyvinyl formal, 3,000 g of a ferromagnetic chromium dioxide having an $H_c$ of 56 kA/m, a mean needle length of 0.24 μm and a BET surface area of 33 m²/g, 30 g of zinc oleate, 15 g of stearic acid and 30 g of methyl stearate were introduced into a stirred ball mill having a capacity of 1.5 l and containing 2.7 kg of ceramic balls with a diameter of from 1 to 1.5 mm, and the batch was dispersed for 12 hours. The dispersion was then filtered off under pressure, provided, while stirring, with 0.04 part, based on 1 part of dispersion, of a 50% strength solution of a triisocyanate of 3 mol of toluylene diisocyanate and 1 mol of trimethylolpropane and, immediately after, applied to a 15 μm thick polyethylene terephthalate film. The coated film was passed through a magnetic field orienting the magnetic particles, then dried at from 50° to 80° C. and calendered by being passed between heated rollers under pressure (nip pressure 200 kg/cm).

EXAMPLE 2

The procedure was as described in Example 1, except that the dispersing time was reduced to 6 hours.

EXAMPLE 3

The procedure was as described in Example 1, except that 80 parts of chromium dioxide and 20 parts of cobalt-doped iron oxide ($H_c$=63 kA/m, BET=40 m²/g) were used.

EXAMPLE 4

The procedure was as in Example 3, except that 60 parts of chromium dioxide and 40 parts of cobalt-doped iron oxide ($H_c$=63 kA/m, BET=40 m²/g) were used.

EXAMPLE 5

The procedure was as described in Example 1, except that the chromium dioxide heated at 180° C. was replaced with a chromium dioxide which had been heated at 350° C. and had an $H_c$ of 51 kA/m.

EXAMPLE 6

The procedure was a described in Examples 1 and 3, except that 10 parts of chromium dioxide having an $H_c$ of 51 kA/m, and a BET surface area of 32 m²/g and 90 parts of cobalt-doped iron oxide ($H_c$=54 kA/m, BET=35 m²/g) were used. For this purpose, the content of the 50% strength solution of the polyurethaneurea acrylate was increased to 380 g and the content of the 50% strength solution of the polyurethaneurea having an OH number of 55 was decreased to 658 g.

COMPARATIVE EXAMPLE 1

The procedure was as in Example 1, except that only the polyurethaneurea (meth)acrylate was replaced with the OH-containing polyurethaneurea having an OH number of 55.

COMPARATIVE EXAMPLE 2

The procedure was as described in Example 1, except that the dispersing time was decreased to 6 hours.

COMPARATIVE EXAMPLE 3

The procedure was as described in Example 3, except that the polyurethaneurea acrylate was replaced with the OH-containing polyurethaneurea having an OH number of 55.

COMPARATIVE EXAMPLE 4

The procedure was as in Comparative Example 3, except that 60 parts of chromium dioxide and 40 parts of cobalt-doped iron oxide ($H_c$=63 kA/m, BET=40 m²/g) were used.

COMPARATIVE EXAMPLE 5

The procedure was as described in Comparative Example 1, except that the chromium dioxide heated at 180° C. was replaced with a chromium dioxide which had been heated at 350° C. and had an $H_c$ of 51 kA/m.

COMPARATIVE EXAMPLE 6

The procedure was as in Comparative Example 1 and 3 except that 10 parts of chromium dioxide ($H_c$=51 kA/m, BET=32 m²/g) and 90 parts of cobalt-doped iron oxide ($H_c$=54 kA/m, BET=35 m²/g) were used.

The use of polyurethaneurea (meth)acrylates leads to stable, pinhole-free dispersions which give smooth surfaces having fine roughness and better magnetic properties and consequently also better electroacoustic data. At the same time, the tape mechanics were improved, this being evident from the better running behavior under humid conditions.

TABLE 1

| Gloss measurement: the reflectance is measured at an angle of 60° on the unsatinized layer | | | | |
|---|---|---|---|---|
| Experiment | Gloss 1 | Gloss 2 | Pinhole 1 | Pinhole 2 |
| Example 1 | 132 | 130 | none | none |
| Example 2 | 132 | 130 | none | none |
| Example 3 | 127 | 127 | none | none |
| Example 4 | 140 | 140 | none | none |
| Example 5 | 99 | 95 | none | none |
| Example 6 | 112 | 113 | none | none |
| Comparative Example 1 | 134 | 130 | none | none |
| Comparative Example 2 | 134 | 38 | none | many |
| Comparative Example 3 | 125 | 125 | none | none |
| Comparative Example 4 | 118 | 75 | few | many |
| Comparative Example 5 | 96 | 60 | none | many |
| Comparative Example 6 | 9 | — | many | many |

Gloss 1: Gloss value of the directly withdrawn dispersion
Gloss 2: Gloss value after 24 hours on roller stand
Pinholes 1: Pinhole evaluation for dispersion directly after withdrawal Pinholes 2: Pinhole evaluation after 24 hours on roller stand

TABLE 2

The measurement of magnetic properties was carried out in the magnetic field of 360 kA/m.

| Experiment | Hc [kA/M] | Mr [mT] | Mr/Mm | OR** | SFD* |
|---|---|---|---|---|---|
| Example 1 | 58.7 | 156 | 0.91 | 4.8 | 0.21 |
| Example 2 | 58.5 | 159 | 0.92 | 4.6 | 0.20 |
| Example 3 | 58.3 | 153 | 0.90 | 4.1 | 0.23 |
| Example 4 | 58.4 | 146 | 0.89 | 4.0 | 0.22 |
| Example 5 | 52.9 | 151 | 0.89 | 3.7 | 0.23 |
| Example 6 | 56.7 | 137 | 0.87 | 3.0 | 0.29 |
| Comparative Example 1 | 57.6 | 145 | 0.89 | 3.6 | 0.24 |
| Comparative Example 2 | 58.3 | 150 | 0.89 | 3.5 | 0.24 |
| Comparative Example 3 | 58.4 | 143 | 0.86 | 3.1 | 0.25 |
| Comparative Example 4 | 55.3 | 138 | 0.86 | 2.9 | 0.28 |
| Comparative Example 5 | 52.4 | 142 | 0.86 | 3.3 | 0.25 |
| Comparative Example 6 | — | — | — | — | — |

*Field strength distribution
**Orientation ratio, residual induction in the plane direction to that in the crosswise direction After the films coated according to the Examples and Comparative Examples having slit into half inch wide tapes, the electroacoustic and video data were determined as follows:

The following measurements were carried out on a S-VHS recorder from Victor Company of Japan against the reference tape SRT-1 (0 dB) (Examples 1 to 3 and Comparative Examples 1 to 3) and on a VHS recorder from Victor Company of Japan against the reference tape BRV 84 (0 dB) (Examples 4 to 6 and Comparative Examples 4 to 5).

Video output level (luminance signal): luminance signal of a 100% white image are measured using a UPSF noise voltage meter from Rohde and Schwarz (>100 kHz).

(Video S/N): Ratio of the luminance signal of a 100% white image to the noise level, measured using an UPSF noise voltage meter from Rohde and Schwarz (>100 kHz).

(Chrome S/N): Ratio of the chrominance signal of a red surface to the noise level, measured using an UPSF noise voltage meter from Rohde and Schwarz (100 kHz–3 MHz).

The measurements are shown in Table 3.

TABLE 3

| Experiment | HF Output | S/N | Chrome S/N | FSM | HiFi output 1.8 MHz |
|---|---|---|---|---|---|
| Example 1 | −0.4 | −0.9 | −1.3 | −2.0 | −2.3 |
| Example 2 | −0.4 | −1.0 | −0.7 | −6.7 | −2.2 |
| Example 3 | −0.6 | −1.0 | −0.9 | −1.5 | −2.8 |
| Example 4 | 2.1 | 3.1 | −0.8 | 0.0 | — |
| Example 5 | 2.0 | 4.2 | 0.1 | 3.8 | −5.2 |
| Example 6 | 1.9 | 4.5 | −0.4 | −1.7 | — |
| Comparative Example 1 | −0.6 | −2.3 | −1.7 | −2.2 | −3.0 |
| Comparative Example 2 | −0.6 | −2.7 | −1.5 | −9.3 | −3.0 |
| Comparative Example 3 | −0.7 | −0.9 | −1.3 | −3.0 | −3.0 |
| Comparative Example 4 | 0.9 | 2.1 | −0.4 | −2.8 | — |
| Comparative Example 5 | 1.1 | 3.8 | −0.4 | 1.3 | −5.5 |
| Comparative Example 6 | — no measurements possible — | | | | |

In addition, the durability under humid conditions was determined. For this purpose, the cassettes were subjected to continuous operation for 100 two-hour cycles at 40° C. and 85% relative humidity.

The results of the measurements are shown in Table 4.

TABLE 4

| Experiment | Durability |
|---|---|
| Example 1 | satisfactory |
| Example 2 | satisfactory |
| Example 3 | satisfactory |
| Example 4 | satisfactory |
| Example 5 | satisfactory |
| Example 6 | satisfactory |
| Comparative Example 1 | satisfactory |
| Comparative Example 2 | blocked |
| Comparative Example 3 | satisfactory |
| Comparative Example 4 | blocked |
| Comparative Example 5 | blocked |
| Comparative Example 6 | — |

EXAMPLE A1

1000 parts by weight of a chromium dioxide having a mean particle length of 0.5 μm and a length/width ratio of 4:1 were dispersed together with 88 parts by weight of a 13% strength solution of a polyurethane elastomer, 86 parts by weight of a 20% strength solution of a polyvinyl formal, consisting of 82% of vinyl formal units, of vinyl acetate units and 6% of vinyl alcohol units, 69 parts by weight of the polyurethaneurea acrylate (50% strength), 10 parts by weight of linseed oil fatty acid and 970 parts by weight of 1:1 tetrahydrofuran/dioxane for 72 hours in a steel ball mill of conventional design containing steel balls as a grinding medium.

A mixture of 864 parts by weight of the 13% strength polyurethane elastomer solution, 57 parts by weight of 20% strength polyvinyl formal solution and 28.8 parts by weight of 1:1 tetrahydrofuran/dioxane were then added to this dispersion and dispersing was continued for a further 2 hours.

19.9 parts by weight of a 50% strength triisocyanate obtained from 3 mol of toluylene diisocyanate and 1 mol of trimethylolpropane were added to 1 kg of the dispersion thus obtained, and the mixture was then filtered through a filter having a pore size of 3 μm. After the dispersion had been applied to 15 μm thick polyester film and the coated film had been passed through a magnetic field to orient the magnetic particles, said film was calendered under pressure at from 50° to 80° C. by being passed between heated rollers.

COMPARATIVE EXPERIMENT A1

The procedure was as described in Example A1, but without the addition of the polyurethaneurea acrylate. 5 parts by weight of N-tallowfatty-1,3-diamine oleate and 20 parts by weight of zinc stearate were added.

EXAMPLE A2

1000 parts by weight of a chromium dioxide having a mean particle length of 0.5 μm and a length/width ratio of 4:1 were dispersed together with 51.5 parts by weight of a 13% strength solution of a polyurethane elastomer, 150 parts by weight of a 20% strength solution of a polyvinyl formal, consisting of 82% of vinyl formal units, 12% of vinyl acetate units and 6% of vinyl alcohol units, 54.5 parts by weight of the polyurethaneurea acrylate (50% strength), 10 parts by weight of linseed oil fatty acid and 1311 parts by weight of 1:1 tetrahydrofuran/dioxane for 72 hours in a steel ball mill of conventional design containing steel balls as a grinding medium.

A mixture of 1025 parts by weight of 13% strength polyurethane elastomer solution was then added to this dispersion, and dispersing was continued for a further 2 hours.

12.2 parts by weight of 50% strength triisocyanate, obtained from 3 mol of toluylene diisocyanate and 1 mol of trimethylolpropane, were added to 1 kg of the dispersion thus obtained, and the mixture was then filtered through a filter having a pore size of 3 μm. After the dispersion had been applied to a 15 μm thick polyester film and the coated film had been passed through a magnetic field to orient the magnetic particles, said film was calendered under pressure at from 50° to 80° C. by being passed between heated rollers.

EXAMPLE A3

The procedure was as described in Example A2, except that 205 parts by weight of the 13% strength polyurethane elastomer solution and 73 parts by weight of the 50% strength polyurethaneurea acrylate were used instead of the 150 parts by weight of the polyvinyl formal.

COMPARATIVE EXPERIMENT A2

The procedure was as described in Example A3, but without the addition of the polyurethaneurea acrylate.

COMPARATIVE EXPERIMENT A3

The procedure was as described in Comparative Experiment A2, except that 5 parts by weight of N-tallowfatty-1,3-diamine oleate and 20 parts by weight of zinc stearate were added.

The magnetic recording media obtained in Examples A1 to A3 and Comparative Experiments A1 to A3 were tested as follows:

The magnetic properties were measured in a magnetic field of 360 kA/m, i.e. the coercive force $H_c$ in [kA/m], the residual induction $M_r$ and the saturation magnetization $M_m$ in [mT] and the orientation ratio Rf, i.e. the residual induction along the preferred magnetic direction to that crosswise to this direction. In addition, the content of chromium (VI) ions in an aqueous extract was determined photometrically with diphenylcarbazide according to DIN 53,780 (eluate value in mg). The corresponding results of the measurements are shown in Table 5.

TABLE 5

|  | $H_c$ | $M_m$ | $M_r$ | $M_r/M_m$ | $R_r$ | Eluate |
|---|---|---|---|---|---|---|
| Example A1 | 41.3 | 204 | 180 | 0.88 | 3.7 | 0.6 |
| Example A2 | 49.2 | 187 | 167 | 0.90 | 3.8 | 1.2 |
| Example A3 | 49.2 | 189 | 171 | 0.90 | 3.8 | 0.9 |
| Comparative Experiment A1 | 40.6 | 198 | 162 | 0.82 | 2.6 | 1.7 |
| Comparative Experiment A2 | 48.8 | 159 | 127 | 0.80 | 1.9 | 1.4 |
| Comparative Experiment A3 | 48.3 | 179 | 147 | 0.82 | 2.7 | 3.5 |

Following slitting into 3.81 mm wide tapes, the electroacoustic properties were tested against the IEC II reference tape, according to DIN 45,401, 45,403 and 45,5212 (sheet 12). The results of the measurements are shown in Table 6.

TABLE 6

|  | Examples | | | Comparative Experiments | | |
|---|---|---|---|---|---|---|
|  | A1 | A2 | A3 | A1 | A2 | A3 |
| Layer thickness [μm] | 5.1 | 4.3 | 4.5 | 5.0 | 4.6 | 4.8 |
| Sensitivity $E_T$ at 315 Hz [dB] | −0.4 | −1.5 | −1.8 | −1.3 | −3 | −2.3 |
| Sensitivity $E_M$ at 3150 Hz [dB] | −1.2 | −1.0 | −1.3 | −2.4 | −2.6 | −1.9 |
| Sensitivity $E_H$ at 10 kHz [dB] | −0.8 | +0.6 | +0.3 | −2.7 | −1.5 | −0.9 |
| Output level at long wavelength $A_T$ 315 Hz [dB] | +1.3 | −2.0 | −2.4 | −0.7 | −1.8 | −2.7 |
| Output level at short wavelength $A_H$ 10 kHz [dB] | −1.0 | +2.2 | +1.8 | −2.8 | −0.1 | +0.5 |
| $RG_o$ | 1.0 | 3 | 2.9 | 1.3 | 3.7 | 3.2 |

We claim:

1. A magnetic recording medium consisting of a nonmagnetic substrate and at least one magnetic layer formed thereon wherein said magnetic layer comprises a magnetic material dispersed in a binder mixture of a polyurethaneurea(meth)acrylate and at least one polyurethane selected from the group consisting of polyurethane elastomers and OH-containing polyureaurethanes, wherein the polyurethaneurea(meth)acrylate is obtained by reacting a poly(meth)acrylate having up to 2 terminal OH groups per mol and a weight average molecular weight of from 200 to 50,000 with a mixture of aliphatic polyisocyanates having an average functionality of from 3.0 to 6 NCO groups per mol and obtained from:

from 0.1 to 10% by weight of a diisocyanate from 20 to 80% by weight of a triisocyanate and from 20 to 60% by weight of an isocyanate having a functionality of from 4 to 10, with the proviso that from 1.2 to 3.0 NCO groups react per OH group and the remaining NCO groups are converted with ammonia into urea groups.

2. A magnetic recording medium consisting of a nonmagnetic substrate and at least one magnetic layer formed thereon wherein said magnetic layer comprises a magnetic material dispersed in a binder mixture of a polyurethaneurea (meth)acrylate and at least one polyurethane selected from the group consisting of polyurethane elastomers and OH-containing polyureaurethanes, wherein the polyurethaneurea (meth)acrylate is obtained by reacting a poly(meth)acrylate having up to 2 terminal OH groups per mol and a weight average molecular weight of from 200 to 50,000 with a mixture of aliphatic polyisocyanates having an average functionality of from 3.0 to 6 NCO groups per mol and obtained from:

from 0.1 to 10% by weight of a diisocyanate from 20 to 80% by weight of a triisocyanate and from 20 to 60% by weight of an isocyanate having a functionality of from 4 to 10 with the proviso that from 1.2 to 3.0 NCO groups react per OH group and the remaining NCO groups are converted with primary or secondary amines into urea groups.

3. A magnetic recording medium as defined in claim 1, wherein the mixture of aliphatic polyisocyanates has an average functionality of from 3.5 to 5.0 NCO groups per mol, with the proviso that from 1.5 to 2.5 NCO groups react per OH group.

4. A magnetic recording medium as defined in claim 2, wherein the mixture of aliphatic polyisocyanates has an average functionality of from 3.5 to 5.0 NCO groups per mol, with the proviso that from 1.5 to 2.5 NCO groups react per OH group.

* * * * *